United States Patent
Park et al.

(10) Patent No.: US 8,923,376 B2
(45) Date of Patent: Dec. 30, 2014

(54) APPARATUS AND METHOD FOR ESTIMATING NOISE AND INTERFERENCE POWER IN COMMUNICATION SYSTEM

(75) Inventors: Si-Hyun Park, Hwaseong-si (KR); Hwa-Sun You, Suwon-si (KR); Min-Ho Jang, Seoul (KR); Hee-Won Kang, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 838 days.

(21) Appl. No.: 13/012,963

(22) Filed: Jan. 25, 2011

(65) Prior Publication Data

US 2011/0182346 A1   Jul. 28, 2011

(30) Foreign Application Priority Data

Jan. 26, 2010   (KR) .................. 10-2010-0007144

(51) Int. Cl.
*H04B 3/46*   (2006.01)
*H04B 17/00*   (2006.01)

(52) U.S. Cl.
CPC .......... *H04B 17/005* (2013.01); *H04B 17/0055* (2013.01)
USPC ........................................ 375/227

(58) Field of Classification Search
CPC ....... H04L 25/0224; H04L 1/005; H04L 1/20; H04L 27/2647; H04B 17/006
USPC .................................. 375/227, 260; 370/280
See application file for complete search history.

(56) References Cited

U.S. PATENT DOCUMENTS

| | | | |
|---|---|---|---|
| 2008/0235314 A1* | 9/2008 | Lee et al. ...................... | 708/426 |
| 2008/0240263 A1* | 10/2008 | Li ................................. | 375/260 |
| 2009/0052357 A1* | 2/2009 | Suo et al. ..................... | 370/280 |

* cited by examiner

*Primary Examiner* — Daniel Washburn
*Assistant Examiner* — Fitwi Hailegiorgis
(74) *Attorney, Agent, or Firm* — Jefferson IP Law, LLP (57) ABSTRACT

An apparatus and a method for estimating a Noise and Interference (NI) power in a communication system are provided. The method includes, calculating average values of impulse responses according to ranging codes, through use of a ranging signal sequence received through a resource allocated to a ranging channel, arranging the average values of the impulse responses according to ranging codes in order of the highest value to the lowest value, and multiplying a ranging code, which corresponds to an impulse response having an $(x+1)^{th}$ peak value among the arranged average values of the impulse responses, by a specific threshold value, and estimating the NI power, wherein "x" represents a number of ranging codes which can be simultaneously received by one ranging channel.

8 Claims, 6 Drawing Sheets

APPARATUS AND METHOD FOR ESTIMATING NOISE AND INTERFERENCE POWER IN COMMUNICATION SYSTEM

PRIORITY

This application claims the benefit under 35 U.S.C. §119 (a) of a Korean patent application filed in the Korean Intellectual Property Office on Jan. 26, 2010, and assigned Serial No. 10-2010-0007144, the entire disclosure of which is hereby incorporated by reference.

BACKGROUND OF THE INVENTION

1. Field of the Invention

The present invention relates to an apparatus and a method for estimating a Noise and Interference (NI) power in a communication system.

2. Description of the Related Art

In next generation communication systems, research is underway to provide users with services of transmitting and receiving large-capacity data at high speed. Representative examples of the next-generation communication system are an Institute of Electrical and Electronics Engineers (IEEE) 802.16m standard and a Long Term Evolution (LTE) standard, which is currently being promoted by the 3rd Generation Partnership Project (3GPP). The IEEE 802.16m standard and the LTE standard use a Zadoff-Chu (ZC) sequence as a reference signal sequence in a ranging channel. The ZC sequence $x_u(n)$ may be expressed as equation 1 below.

$$x_u(n) = e^{-j\frac{\pi u n(n+1)}{N_{ZC}}}, \quad (1)$$
$$0 \le n \le N_{ZC} - 1$$

In addition, a signal sequence $x_{u,v}(n)$ obtained when the ZC sequence $x_u(n)$ is cyclic-shifted by "v" may be expressed as equation 2 below.

$$x_{u,v}(n) = x_u((n+C_v) \bmod N_{ZC}) \quad (2)$$

In equations 1 and 2, "u" denotes a root index, "n" denotes a code index, "$N_{ZC}$" denotes a length of a ZC sequence, "v" denotes a cyclic shift index, and "C" denotes a cyclic shift length.

The ZC sequence has the characteristic that, while the cross-correlation between codes having different cyclic shifts in an equal root is zero, the cross-correlation between codes of different roots is $\sqrt{N_{ZC}}$.

Figure 1:
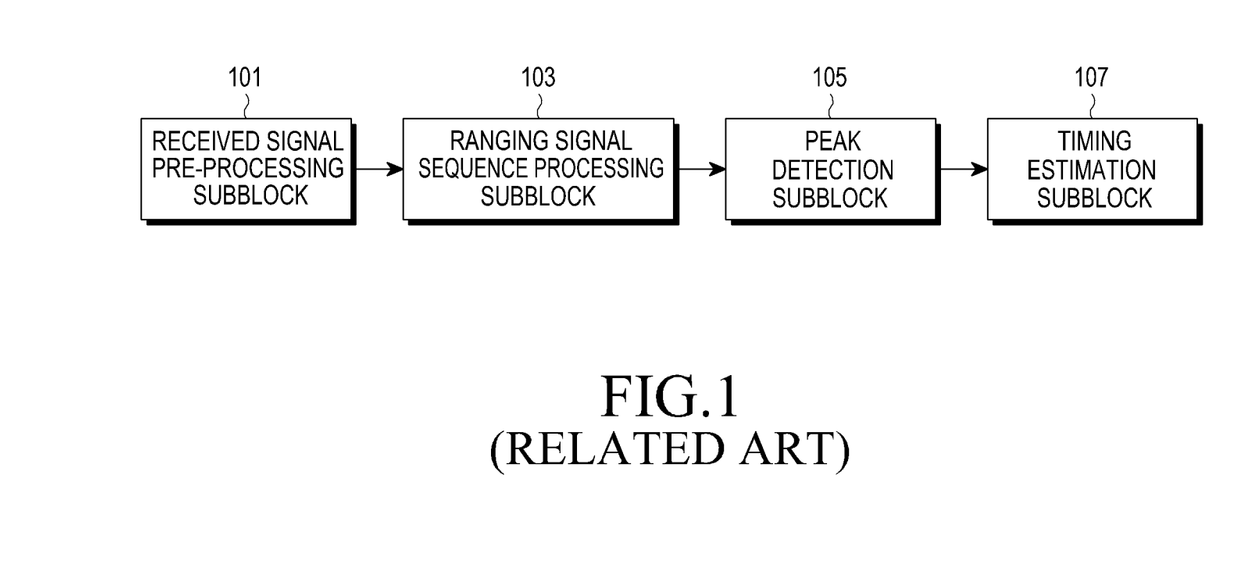
FIG. 1 is a block diagram illustrating a configuration of a ranging channel detector using a Zadoff-Chu (ZC) sequence in a communication system according to the related art.

FIG. 1 is a block diagram illustrating a configuration of a ranging channel detector using a ZC sequence in a communication system according to the related art.

Referring to FIG. 1, a ranging channel detector includes a received signal pre-processing sub-block 101, a ranging signal sequence processing sub-block 130, a peak detection sub-block 105, and a timing estimation sub-block 107.

It is impossible to divide the resources of a ranging channel into subchannels or Physical Resource Units (PRUs) through a Fast Fourier transform (FFT) with another traffic channel or control channel. Therefore, in order to divide the resources of the ranging channel, a separate processing procedure must be performed on a received signal of each antenna before the FFT is performed.

The received signal pre-processing sub-block 101 extracts a ranging signal sequence, which is mapped to the resources of the ranging channel, from a received signal, and outputs the extracted ranging signal sequence to the ranging signal sequence processing sub-block 130. The ranging signal sequence processing sub-block 130 receives and multiplies the extracted ranging signal sequence having a length of "N" by a ranging signal sequence allocated to a base station, and performs an Inverse Fast Fourier transform (IFFT) on a resultant signal. Next, the ranging signal sequence processing sub-block 130 squares each component of the IFFT-processed signal, removes a phase component, and then outputs a resultant signal to the peak detection sub-block 105. Here, the allocated ranging signal sequence is transferred to a terminal, having a ranging channel detector, in the form of the square root of a ZC sequence through a super frame header.

The peak detection sub-block 105 receives the output of the ranging signal sequence processing sub-block 130, which has been generated according to each reception antenna. Then, the peak detection sub-block 105 adds values, which are received from each reception antenna, to each other according to each equal ZC sequence, and segments the received and added values according to each root index. That is, the peak detection sub-block 105 receives an N-length output signal of the ranging signal sequence processing sub-block 130, segments the received signal in a unit length "L" (wherein L=N/N), performs a cyclic shift on the segmented signals, and distinctively estimates impulse responses according to each ranging code in an order in which the cyclic shift is performed. Thereafter, the peak detection sub-block 105 detects a peak value among the estimated impulse responses. When the detected peak value exceeds a specific threshold value "NI," representing noise and interference, the peak detection sub-block 105 determines that a corresponding ranging code has been received, and outputs a code index of the corresponding ranging code to the timing estimation sub-block 107.

The timing estimation sub-block 107 receives the code index of the corresponding ranging code, and uses the received code index as a timing estimation value for synchronization between the base station and the terminal.

Figure 2:
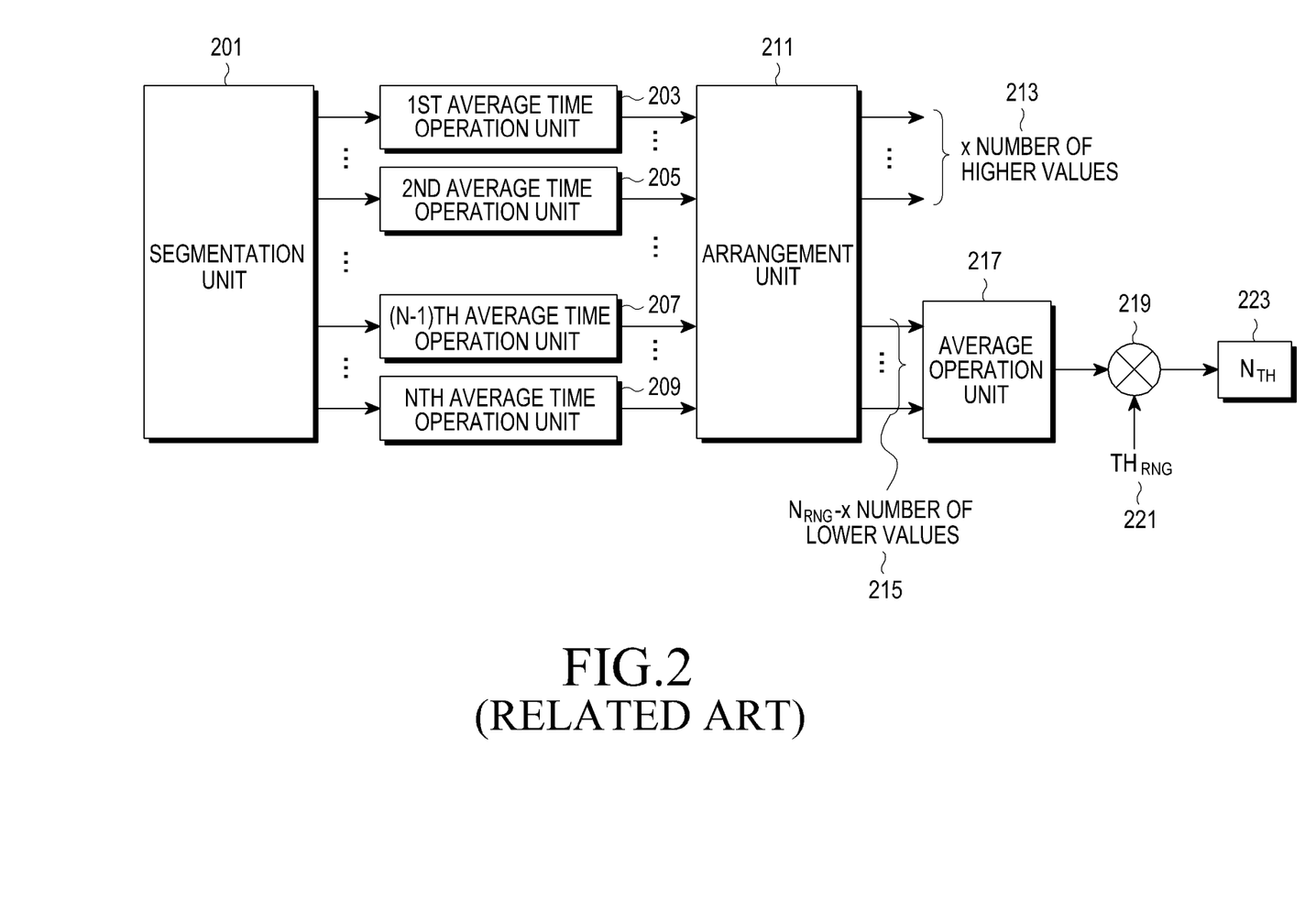
FIG. 2 is a block diagram illustrating a configuration of a Noise and Interference (NI) power estimator for estimating a specific threshold value "NI" according to the related art.

FIG. 2 is a block diagram illustrating a configuration of an NI power estimator for estimating a specific threshold value "NI" according to the related art.

Referring to FIG. 2, an NI power estimator includes a segmentation unit 201, first to nth average time operation units 203, 205, 207, and 209, an arrangement unit 211, an average operation unit 217, and a multiplication unit 219. The specific threshold value "NI" is used in the peak detection sub-block 105 of FIG. 1 and the NI power estimator may be either included in the peak detection sub block 105 or separately constructed, or may be constructed to share the same function.

The segmentation unit 201 segments an N-length signal, which has been output from the ranging signal sequence processing sub-block 130, based on a length of "L" (wherein L=N/N) corresponding to each ranging code, and then outputs the segmented signals to the first to nth average time operation units 203, 205, 207, and 209 corresponding to the respective ranging codes. Each of the first to nth average time operation units 203, 205, 207, and 209 calculates a time average of impulse responses with respect to the L-length signal input according to each ranging code, and outputs the calculated time average to the arrangement unit 211. The arrangement unit 211 arranges average values of impulse responses according to each ranging code in order of the highest value to the lowest value, and outputs ranging codes in order of average value of impulse responses. In this case, among the arranged average values of impulse responses, ranging codes corresponding to x number of higher average values 213 and ranging codes corresponding to "N-x" number of lower average values 215 are separately output in distinction from each other.

Since a ranging channel is a random access channel, ranging codes which may be simultaneously received through one ranging channel can be randomly selected by a terminal from a total of N ranging codes. However, since a contention probability between the ranging codes must be controlled to be equal to or less than a predefined level, the number of ranging codes which may be simultaneously received through one physical ranging channel is actually very small. Therefore, the number of ranging codes which can be simultaneously received through one ranging channel is limited to "x," as described above.

The average operation unit 217 receives the "N-x" number of lower ranging codes 215, calculates an overall average value of average values of impulse responses of the received ranging codes, and outputs the calculated overall average value to the multiplication unit 219. The multiplication unit 219 multiplies the input overall average value by a specific constant "TH" 221, and estimates a specific threshold value "NI" 223 used in the peak detection sub-block 105.

Figure 3:
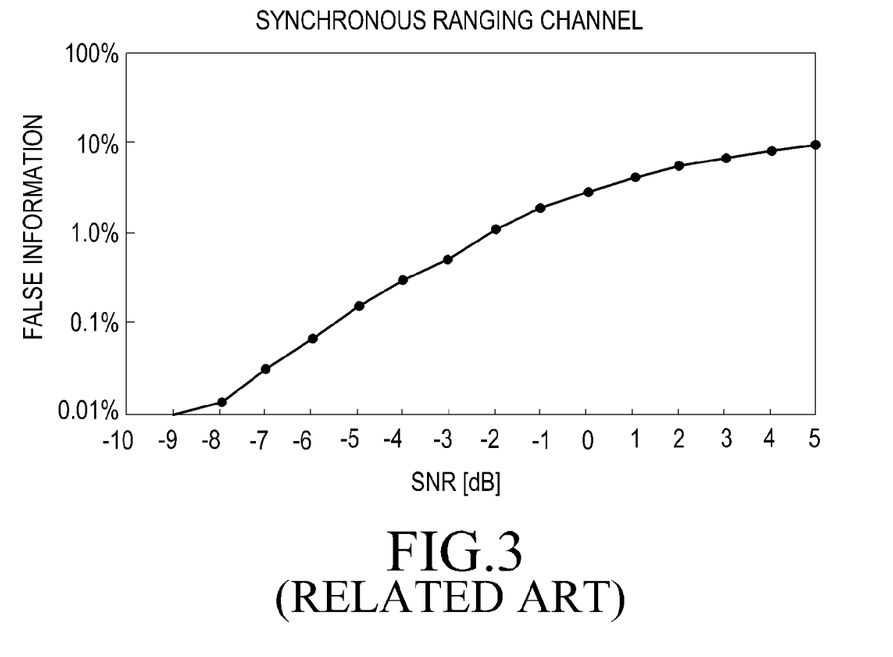
FIG. 3 is a graph illustrating a probability of a false alarm as a function of a Signal-to-Noise Ratio (SNR) in a synchronous ranging channel in standard environments according to the related art.
Figure 4:
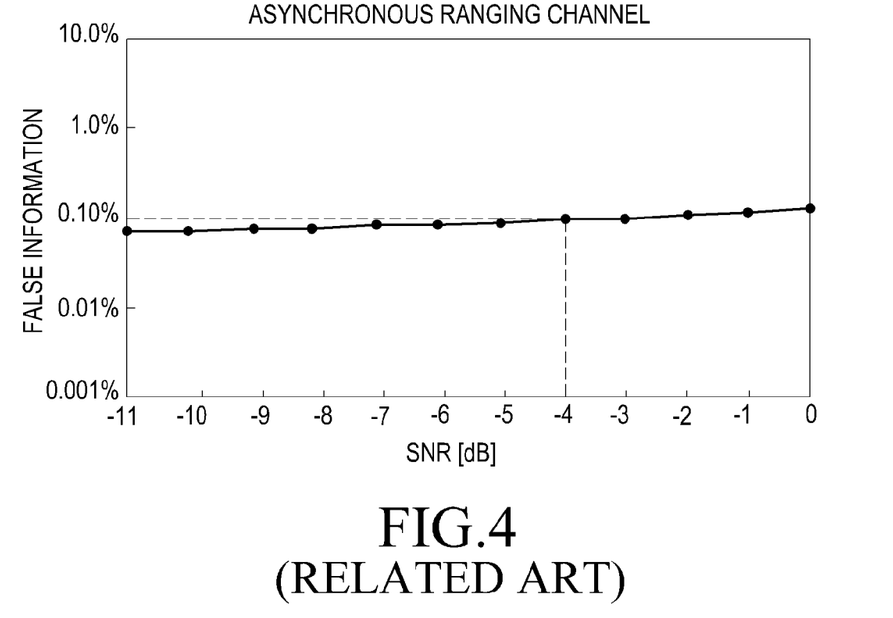
FIG. 4 is a graph illustrating a probability of a false alarm as a function of an SNR in an asynchronous ranging channel in standard environments according to the related art.

However, when an overall average value of average values of impulse responses of the "N-x" number of lower ranging codes 215 is set as an NI power value, a false alarm increases according to an increase of a Signal-to-Noise Ratio (SNR), as shown in FIGS. 3 and 4, which makes it impossible to satisfy a target false alarm. Here, the probability of the "false alarm" represents the probability that it is falsely determined that a base station has received a ranging code which a terminal has not transmitted. The probability of the false alarm may be expressed as equation 3.

$$\text{False alarm} = \frac{\text{Number of total false} - \text{detections}}{\text{Number of total candidate ranging codes} - \text{Number of total transmitted ranging codes}} \quad (3)$$

In equation 3, the probability of the false alarm may be obtained by dividing a total number of times of detection of a false alarm by a difference between a total number of ranging codes transmittable by a terminal and a total number of ranging codes actually transmitted by the terminal.

FIG. 3 is a graph illustrating a probability of a false alarm as a function of a SNR in a synchronous ranging channel in standard environments according to the related art.

Referring to FIG. 3, a probability of a false alarm is illustrated when the SNR has a range from −10 to 5 dB, wherein it can be understood that, as the SNR increases, the probability of the false alarm increases at a high rate.

As an example of the standard environments, a case where a pedestrian is moving at a speed of 3 km/h is assumed, which is an environment defined in the IEEE 802.16 system standard. In addition, the probability of a false alarm is illustrated in FIG. 3 as a function of the SNR when an overall average value of average values of impulse responses of the "N−x" number of lower ranging codes 215 is set as an NI power value.

FIG. 4 is a graph illustrating a probability of a false alarm as a function of an SNR in an asynchronous ranging channel in standard environments according to the related art.

Referring to FIG. 4, a probability of a false alarm is illustrated when the SNR has a range from −11 to 0 dB. In FIG. 4, it can be understood that, although the probability of the false alarm does not increase at a high rate as the SNR increases, differently from the case of the synchronous ranging channel, the probability of the false alarm gradually increases as the SNR increases, and exceeds 0.1% at an SNR of −4.0 dB.

The reason why the probability of the false alarm increases as the SNR increases is that an NI power estimated by the NI power estimator is too small. When the NI power is estimated, an average of impulse responses to ranging codes, which belong to the same root as a ranging code transmitted from a terminal, but have cyclic shifts different from that of the ranging code transmitted from the terminal, becomes a value in which a cross-correlation is added by noise having a Gaussian random distribution. In such a situation, when an NI power is estimated by calculating an overall average value of average values of impulse responses of the "N-x" number of lower ranging codes 215, as illustrated in FIG. 2, ranging codes having an average value exceeding the calculated overall average value, among the average values of the impulse responses of the "N−x" number of lower ranging codes 215, do not correspond to ranging codes transmitted from a terminal, but are recognized as ranging codes received by a base station, thereby increasing the generation of the false alarm.

Therefore, a need exists for an apparatus and a method for reducing the generation of the false alarm by estimating an NI power in a communication system.

SUMMARY OF THE INVENTION

An aspect of the present invention is to address the above-mentioned problems and/or disadvantages and to provide at least the advantages described below. Accordingly, an aspect of the present invention is to provide an apparatus and a method for estimating a Noise and Interference (NI) power in a communication system.

Another aspect of the present invention is to provide an apparatus and a method for estimating an NI power, which is used as a threshold value for detection of a ranging channel, in a communication system.

Still another aspect of the present invention is to provide an apparatus and a method for estimating an NI power, which can reduce the probability of a false alarm of ranging channels, in a communication system.

In accordance with an aspect of the present invention, an apparatus for estimating an NI power in a communication system is provided. The apparatus includes, an average time operation unit for calculating average values of impulse responses according to ranging codes, through use of a ranging signal sequence received through a resource allocated to a ranging channel, an arrangement unit for arranging the average values of the impulse responses according to ranging codes in order of the highest value to the lowest value, and a multiplication unit for multiplying a ranging code, which corresponds to an impulse response having an $(x+1)^{th}$ peak value among the arranged average values of the impulse responses, by a specific threshold value, and estimating the NI power, wherein "x" represents a number of ranging codes which can be simultaneously received by one ranging channel.

In accordance with another aspect of the present invention, a method for estimating an NI power in a communication system is provided. The method includes the steps of, calculating average values of impulse responses according to ranging codes, through use of a ranging signal sequence received through a resource allocated to a ranging channel, arranging the average values of the impulse responses according to ranging codes in order of the highest value to the lowest value, and multiplying a ranging code, which corresponds to an impulse response having an $(x+1)^{th}$ peak value among the arranged average values of the impulse responses, by a specific threshold value, and estimating the NI power, wherein "x" represents a number of ranging codes which can be simultaneously received by one ranging channel.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention include an apparatus and a method for estimating a Noise and Interference (NI) power in a communication system. Although the following description will be given with an Institute of Electrical and Electronics Engineers (IEEE) 802.16m system standard in order to explain an exemplary embodiment of the present invention, it goes without saying that the apparatus and a method for estimating the NI power are not limited to such a specific system standard.

FIGS. 5 through 8, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly state otherwise. A set is defined as a non-empty set including at least one element.

Figure 5:
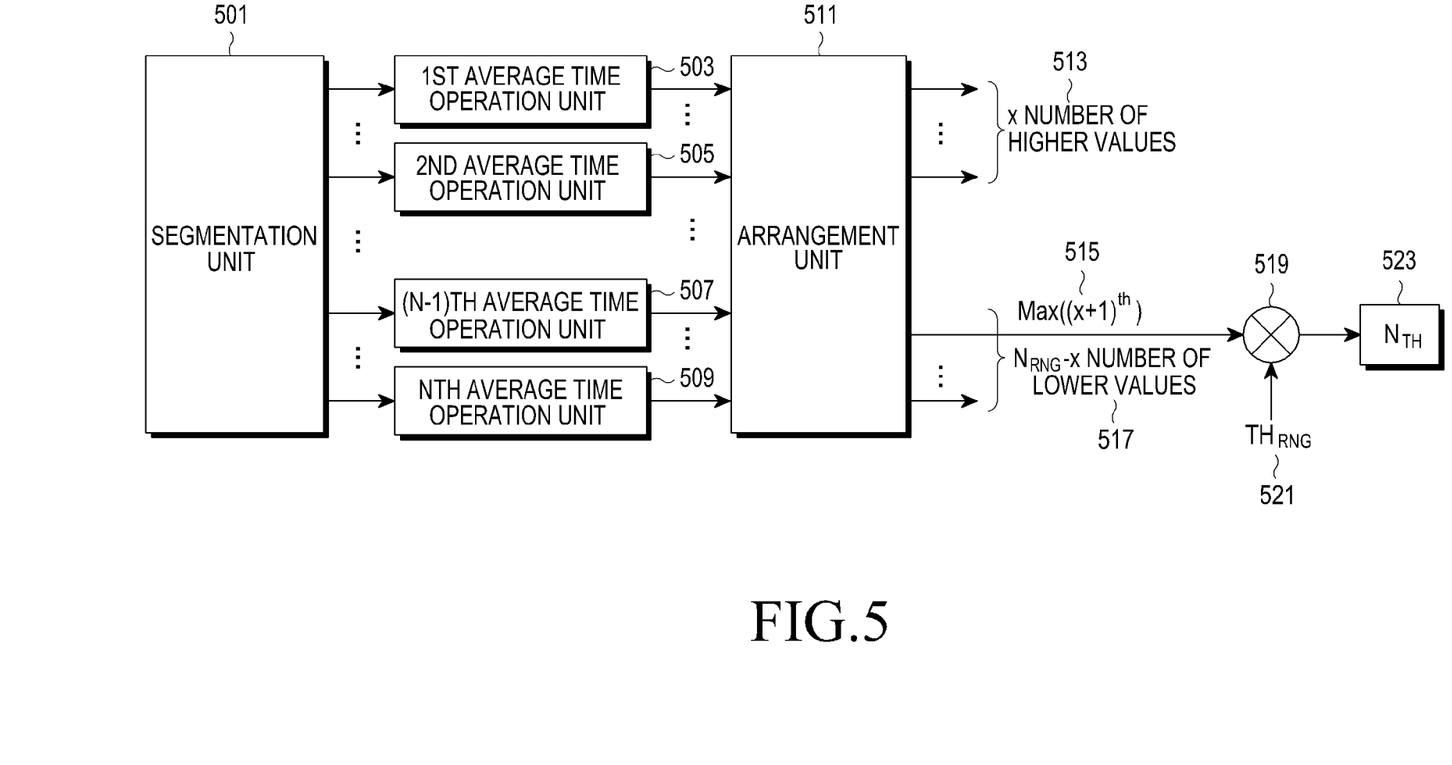
FIG. 5 is a block diagram illustrating a configuration of an NI power estimator for estimating a specific threshold value "NI" according to an exemplary embodiment of the present invention.

FIG. 5 is a block diagram illustrating a configuration of an NI power estimator for estimating a specific threshold value "NI" according to an exemplary embodiment of the present invention.

Referring to FIG. 5, an NI power estimator includes a segmentation unit 501, first to $n^{th}$ average time operation units 503, 505, 507, and 509, an arrangement unit 511, and a multiplication unit 519. The specific threshold value "NI" is used in detecting a peak value of impulse responses in a ranging channel.

The segmentation unit 501 segments an N-length signal based on a length of "L" corresponding to each ranging code, and then outputs the segmented signals to the first to $n^{th}$ n average time operation units 503, 505, 507, and 509 corresponding to the respective ranging codes, respectively. Each of the first to $n^{th}$ average time operation units 503, 505, 507, and 509 calculates a time average of impulse responses with respect to the L-length signal (wherein L=N/N) input according to each ranging code, and outputs the calculated time average to the arrangement unit 511. The arrangement unit 511 arranges average values of impulse responses according to each ranging code in order of the highest value to the lowest value, and outputs ranging codes in order of average value of impulse responses. In this case, among the arranged average values of impulse responses, ranging codes corresponding to x number of higher average values 513 and a ranging code having the peak value of ranging codes corresponding to "N-x" number of lower average values 517, i.e., a ranging code having an $(x+1)^{th}$ peak value 515 of average values of impulse responses, are separately output in distinction from each other.

The ranging code having the $(x+1)^{th}$ peak value of average values of impulse responses is input to the multiplication unit 519. The multiplication unit 519 multiplies the average value of the impulse response of the input ranging code by a specific constant "TH" 521, and estimates a specific threshold value "NI" 523, which is used in detecting a peak value of impulse responses according to ranging codes.

Figure 6:
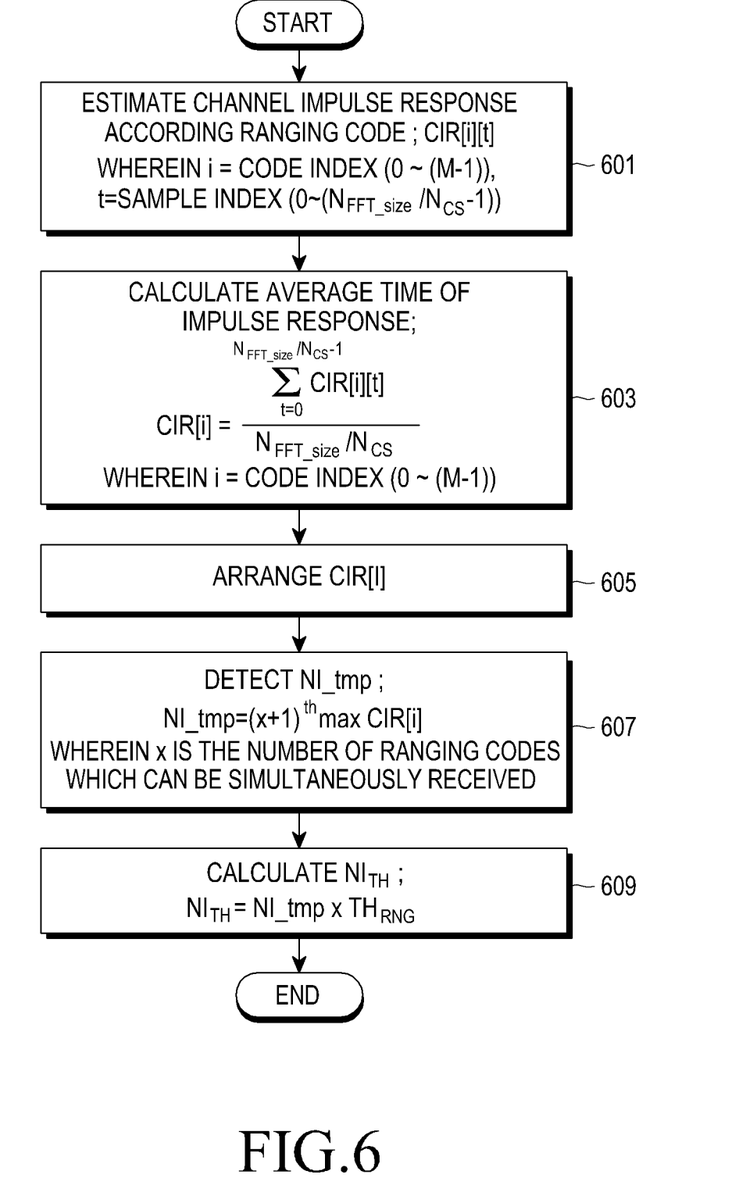
FIG. 6 is a flowchart illustrating a method for estimating a specific threshold value "NI" according to an exemplary embodiment of the present invention.

FIG. 6 is a flowchart illustrating a method for estimating a specific threshold value "NI" according to an exemplary embodiment of the present invention.

Referring to FIG. 6, an NI power estimator estimates a Channel Impulse Response (CIR)[i][t], according to each ranging code in step 601, and then proceeds to step 603. Here, the "i" represents a code index for identifying each ranging code, and has a value between 0 and "M-1." The "t" represents a sample index for identifying each of samples constituting each code, and has a value between 0 and "N/N-1."

In step 603, the NI power estimator calculates average values CIR[i] of impulse responses of M ranging codes by equation 4 below, and proceeds to step 605.

$$CIR[i] = \frac{\sum_{t=0}^{N_{FFT\_size}/N_{CS}-1} CIR[i][t]}{N_{FFT\_size}/N_{CS}} \quad (4)$$

In step 605, the NI power estimator arranges the average values CIR[i] of impulse responses of M ranging codes, which have been calculated in step 603, in order of the highest value to the lowest value, and then proceeds to step 607.

In step 607, the NI power estimator detects an average value NI_tmp of an impulse response of a ranging code having an $(x+1)^{th}$ peak value, from among the average values of the impulse responses of M ranging codes. Here, "x" represents the number of ranging codes which can be simultaneously received by one ranging channel.

In step 609, the NI power estimator multiplies the average value NI_tmp, detected in step 607, by a predefined specific constant "TH," thereby estimating a specific threshold value "NI", which is used in detecting a peak value of impulse responses according to each ranging code. The "TH" is a constant, which has been predefined according to the "NI_tmp" with a threshold value used in detecting a peak value of impulse responses according to each ranging code, and may be obtained, for example, through a simulation.

Figure 7:
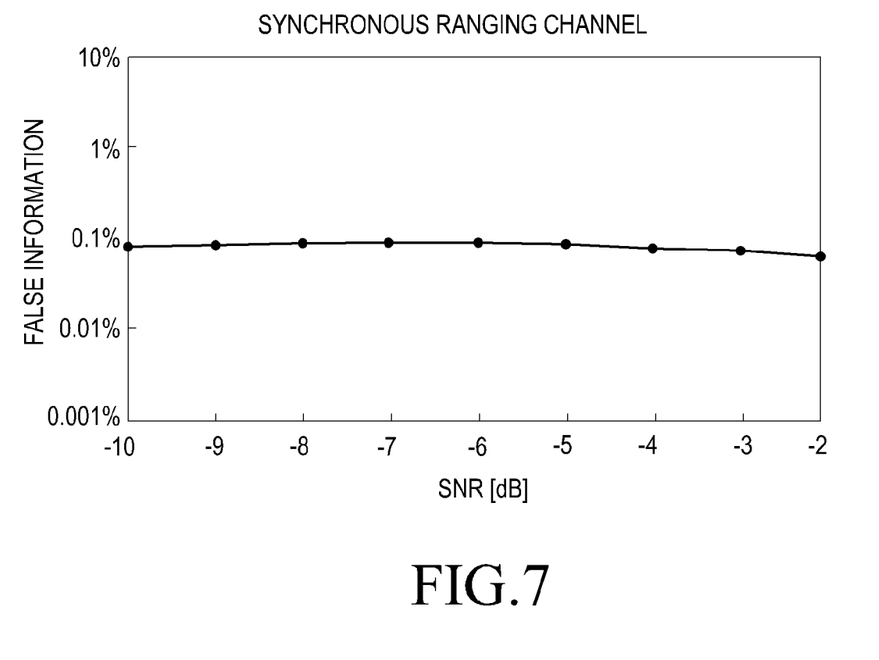
FIG. 7 is a graph illustrating a probability of a false alarm as a function of an SNR in a synchronous ranging channel in standard environments according to an exemplary embodiment of the present invention.

FIG. 7 is a graph illustrating a probability of a false alarm as a function of an SNR in a synchronous ranging channel in standard environments according to an exemplary embodiment of the present invention.

Referring to FIG. 7, a probability of a false alarm is illustrated when the SNR has a range from -10 to -2 dB, wherein it can be understood that the probability of a false alarm is fixed at 0.1% regardless of an increase of the SNR. Furthermore, the probability of the false alarm is illustrated as a function of the SNR when an average value of impulse responses of a ranging code, which has an $(x+1)^{th}$ peak value among average values of impulse responses, is set as an NI power value.

Figure 8:
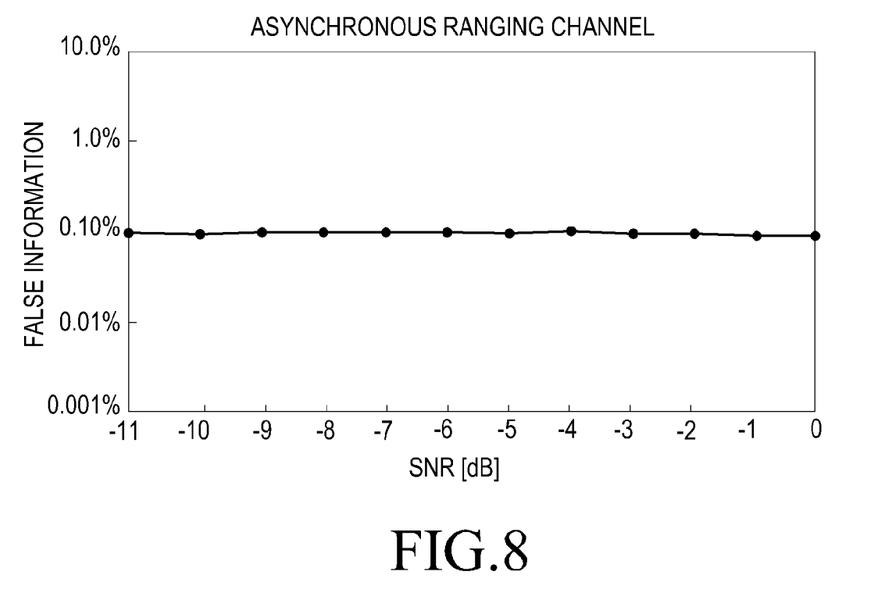
FIG. 8 is a graph illustrating a probability of a false alarm as a function of an SNR in an asynchronous ranging channel in standard environments according to an exemplary embodiment of the present invention.

FIG. 8 is a graph illustrating a probability of a false alarm as a function of an SNR in an asynchronous ranging channel in standard environments according to an exemplary embodiment of the present invention.

Referring to FIG. 8, a probability of a false alarm is illustrated when the SNR has a range from -11 to 0 dB, wherein it can be understood that the probability of the false alarm is fixed at 0.1% regardless of an increase of the SNR.

As described above, according to an exemplary embodiment of the present invention, an average value of impulse responses of a ranging code, which has an $(x+1)^{th}$ peak value among average values of impulse responses, among a total of N ranging codes is set as an NI power value, so that not only ranging codes having different cyclic shifts in an equal root, but also ranging codes of different roots all have values equal to or less than the NI power value, and thus it is possible to prevent a false alarm from occurring.

In addition, a problem that, as the SNR increases, statistically, an NI power value is estimated to be a smaller value is solved, so that it is possible to address the existing problem that the probability of a false alarm increases as the SNR increase.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for estimating a Noise and Interference (NI) power in a communication system, the apparatus comprising:
    an average time operation unit for calculating average values of impulse responses according to ranging codes, through use of a ranging signal sequence received through a resource allocated to a ranging channel;
    an arrangement unit for arranging the average values of the impulse responses according to ranging codes in order of the highest value to the lowest value; and
    a multiplication unit for estimating the NI power according to a multiplication of a ranging code, which corresponds to an impulse response having an $(x+1)^{th}$ peak value among the arranged average values of the impulse responses, by a specific threshold value,
    wherein "x" represents a number of ranging codes which can be simultaneously received by one ranging channel.

2. The apparatus of claim 1, further comprising:
    a peak detection sub-block for, when a peak value among the arranged average values of the impulse responses exceeds the estimated NI power, determining that a ranging code corresponding to an impulse response having the peak value has been received by a terminal.

3. The apparatus of claim 2, wherein among the arranged average values of impulse responses, ranging codes corresponding to x number of higher average values and a ranging code (N) having the peak value of ranging codes corresponding to "N-x" number of lower average values are separately output in distinction from each other.

4. The apparatus of claim 1, wherein the ranging signal sequence is configured with a Zadoff-Chu sequence.

5. A method for estimating a Noise and Interference (NI) power in a communication system, the method comprising:
    calculating average values of impulse responses according to ranging codes, through use of a ranging signal sequence received through a resource allocated to a ranging channel;
    arranging the average values of the impulse responses according to ranging codes in order of the highest value to the lowest value; and
    estimating the NI power according to a multiplication of a ranging code, which corresponds to an impulse response having an $(x+1)^{th}$ peak value among the arranged average values of the impulse responses, by a specific threshold value,
wherein "x" represents a number of ranging codes which can be simultaneously received by one ranging channel.

6. The method of claim 5, further comprising:
when a peak value among the arranged average values of the impulse responses exceeds the estimated NI power, determining that a ranging code corresponding to an impulse response having the peak value has been received by a terminal.

7. The method of claim 6, wherein among the arranged average values of impulse responses, ranging codes corresponding to x number of higher average values and a ranging code having the peak value of ranging codes corresponding to "N−x" number of lower average values are separately output in distinction from each other.

8. The method of claim 5, wherein the ranging signal sequence is configured with a Zadoff-Chu sequence.

* * * * *